US011255983B2

(12) United States Patent
Hofrichter et al.

(10) Patent No.: US 11,255,983 B2
(45) Date of Patent: Feb. 22, 2022

(54) SEMICONDUCTOR DEVICE FOR INDIRECT DETECTION OF ELECTROMAGNETIC RADIATION AND METHOD OF PRODUCTION

(71) Applicant: ams International AG, Rapperswil (CH)

(72) Inventors: Jens Hofrichter, Gattikon (CH); Guy Meynants, Retie (BE); Josef Pertl, Graz (AT); Thomas Troxler, Erlenbach (CH)

(73) Assignee: AMS INTERNATIONAL AG, Rapperswil (CH)

(*) Notice: Subject to any disclaimer, the term of this patent is extended or adjusted under 35 U.S.C. 154(b) by 0 days.

(21) Appl. No.: 16/608,272

(22) PCT Filed: Apr. 19, 2018

(86) PCT No.: PCT/EP2018/060072
§ 371 (c)(1),
(2) Date: Oct. 25, 2019

(87) PCT Pub. No.: WO2018/202431
PCT Pub. Date: Nov. 8, 2018

(65) Prior Publication Data
US 2020/0124748 A1     Apr. 23, 2020

(30) Foreign Application Priority Data

May 3, 2017    (EP) ..................................... 17169279

(51) Int. Cl.
*G01T 1/20*    (2006.01)

(52) U.S. Cl.
CPC .................................. *G01T 1/2018* (2013.01)

(58) Field of Classification Search
CPC ...... H01L 23/3121; H01L 24/04; H01L 24/48; G01T 1/2018
See application file for complete search history.

(56) References Cited

U.S. PATENT DOCUMENTS

| | | | |
|---|---|---|---|
| 7,403,589 B1 | 7/2008 | Short et al. | |
| 9,151,668 B1* | 10/2015 | Nagarkar | ................... G01T 1/16 |
| 2007/0132052 A1* | 6/2007 | Sargent | ............... H01L 31/0352 |
| | | | 257/443 |

(Continued)

FOREIGN PATENT DOCUMENTS

| | | |
|---|---|---|
| EP | 3032583 A1 | 6/2016 |
| KR | 101034471 | 7/2010 |

(Continued)

OTHER PUBLICATIONS

Nayfeh, M. H. et al., "Thin Film Silicon Nanoparticle UV Photodetector," IEEE Photonics Technology Letters, IEEE Service Center, Piscataway, NJ, US, vol. 16, No. 8, Aug. 1, 2004 (Aug. 1, 2004), pp. 1927-1929.

(Continued)

*Primary Examiner* — David P Porta
*Assistant Examiner* — Mamadou Faye
(74) *Attorney, Agent, or Firm* — MH2 Technology Law Group LLP (57) ABSTRACT

The semiconductor device comprises a substrate of semiconductor material having a main surface, an integrated circuit in the substrate, a photodetector element or array of photodetector elements arranged at or above the main surface, and at least one nanomaterial film arranged above the main surface. At least part of the nanomaterial film has a scintillating property. The method of production includes the use of a solvent to apply the nanomaterial film, in particular by inject printing, by silk-screen printing, by spin coating or by spray coating.

17 Claims, 6 Drawing Sheets

(56) References Cited

U.S. PATENT DOCUMENTS

| | | |
|---|---|---|
| 2007/0158573 A1 | 7/2007 | Deych |
| 2007/0183580 A1 | 8/2007 | Popescu et al. |
| 2008/0199629 A1* | 8/2008 | Simor .................. B05D 1/62 427/488 |
| 2009/0181478 A1* | 7/2009 | Cox .................. H01L 21/02628 438/22 |
| 2010/0193700 A1 | 8/2010 | Herrmann et al. |
| 2010/0200760 A1 | 8/2010 | Baeumer et al. |
| 2011/0216878 A1 | 9/2011 | Roessl |
| 2013/0187053 A1 | 7/2013 | Colby |
| 2013/0248729 A1 | 9/2013 | Hannemann et al. |
| 2013/0292574 A1 | 11/2013 | Levene et al. |
| 2015/0122327 A1 | 5/2015 | Euliss et al. |
| 2015/0236178 A1* | 8/2015 | Ono .................. H01L 31/1856 428/338 |
| 2016/0154120 A1 | 6/2016 | Suponnikov et al. |
| 2016/0258807 A1* | 9/2016 | Pein .................. G01J 5/046 |
| 2017/0031211 A1 | 2/2017 | Park et al. |

FOREIGN PATENT DOCUMENTS

| | | |
|---|---|---|
| WO | 2008/118523 A2 | 10/2008 |
| WO | 2017/015473 A1 | 1/2017 |
| WO | 2017/025888 | 2/2017 |

OTHER PUBLICATIONS

Ulzheimer and Flohr, "Multislice CT: Current Technology and Future Developments," 22 pages.

European Patent Office, International Search Report for PCT/EP2018/060072, dated Jul. 25, 2018.

* cited by examiner

SEMICONDUCTOR DEVICE FOR INDIRECT DETECTION OF ELECTROMAGNETIC RADIATION AND METHOD OF PRODUCTION

CROSS-REFERENCE TO RELATED APPLICATIONS

The present application is the national stage entry of International Patent Application No. PCT/EP2018/060072, filed on Apr. 19, 2018, which claims the benefit of priority of European Patent Application No. 17169279.1, filed on May 3, 2017, all of which are hereby incorporated by reference in their entirety for all purposes.

BACKGROUND OF THE INVENTION

Scintillators are used in semiconductor imaging devices for an indirect detection of high-energy electromagnetic or ionizing radiation, such as x-rays and gamma-rays, in various applications including medical imaging applications, for example. Incident high-energy radiation is transformed to electromagnetic radiation in the visible spectrum, which can be detected by conventional photodiodes.

Nanodots are small particles having dimensions of typically several nanometers. When electricity or light is applied to them, they emit light of specific wavelengths depending on the size, shape and material of the nanodots. Nanorods are small particles of elongated shape. Nanowires are small particles of elongated shape that in one axis extend substantially longer than their diameter. A layer of aligned nanorods or nanowires emits polarized light.

U.S. 2007/0158573 A1 discloses an x-ray detector comprising a plurality of detector elements, each of which includes a first scintillator layer converting x-rays into light of a first wavelength and a second scintillator layer converting x-rays that have passed through the first scintillator layer into light of a second wavelength.

U.S. Pat. No. 7,403,589 B1 discloses a computed tomography (CT) detector with photomultiplier and scintillator to convert x-rays to optical photons.

U.S. 2010/0193700 A1 discloses a spectral photon counting detector comprising a radiation sensitive detector including a scintillator in optical communication with a photosensor.

U.S. 2010/0200760 A1 discloses a radiation detector comprising a stack of scintillator elements and photodiode arrays.

U.S. 2011/0216878 A1 discloses a spectral processor with first and second processing channels deriving first and second spectral signals from a detector signal to obtain a spectral resolution of the detector signal.

U.S. 2013/0187053 A1 discloses a digital quantum dot radiographic detection system including a scintillation subsystem and a detection subsystem.

U.S. 2013/0248729 A1 discloses an x-ray detector wherein the detector elements use a sensor material that converts incident photons directly into charge carriers moving freely in the sensor material. A circuit determines the number of photons in relation to predefined energy ranges. The total electrical power of a detector element is kept constant.

U.S. 2013/0292574 A1 discloses a CT detector array with at least one thin photosensor array layer disposed between at least two scintillator array layers.

WO 2017/025888 A1 discloses an imaging system for computed tomography, which comprises a radiation sensitive detector array including detector pixels with an optically transparent encapsulate material with particles supporting different scintillation materials. Each scintillation material is in the form of a nanometer to micrometer quantum dot.

U.S. 2017/0031211 A1 discloses a method of fabricating a quantum rod layer and a display device including the same.

SUMMARY OF THE INVENTION

The semiconductor device for detection of electromagnetic radiation comprises a substrate of semiconductor material having a main surface, an integrated circuit in the substrate, and a photodetector element or array of photodetector elements arranged at or above the main surface. A nanomaterial film, which may particularly comprise nanodots, nanorods or nanowires or any combination thereof, is applied on top of the semiconductor device. A dielectric layer is optionally arranged between the nanomaterial film and the photodetector element or array of photodetector elements. At least part of the nanomaterial film has a scintillating property.

The semiconductor device is especially intended for detection of high-energy electromagnetic radiation or ionizing radiation. The scintillating property means that high-energy electromagnetic radiation or ionizing radiation is transformed to electromagnetic radiation within a range of wavelengths that typically extends from 300 nm to about 1000 nm, including visible light. The range of wavelengths may particularly match the absorption spectrum of silicon.

An embodiment of the semiconductor device comprises a further nanomaterial film. At least part of the further nanomaterial film has an absorbing property and covers an area of the main surface that is outside the area of the photodetector element or array of photodetector elements. Thus no photodetector element is covered with an absorbing layer. The further nanomaterial film may comprise nanodots, nanorods or nanowires or any combination thereof.

A further embodiment of the semiconductor device comprises at least two photodetector elements and at least one further nanomaterial film, at least part of which has a scintillating property. Each photodetector element is covered by the nanomaterial film or by such a further nanomaterial film.

In a further embodiment, the nanomaterial film and at least one further nanomaterial film are matched to two different electromagnetic energy levels.

In a further embodiment, the nanomaterial film and at least one further nanomaterial film have different emission wavelengths.

In a further embodiment, the nanomaterial film has an emission wavelength in the range from 300 nm to 1000 nm.

In a further embodiment, the nanomaterial film has an emission wavelength in the range from 400 nm to 850 nm.

In a further embodiment, the nanomaterial film comprises PbS, PbSe, ZnS, ZnS, CdSe, CdTe or a combination thereof.

In a further embodiment, the nanomaterial film comprises a core-shell structure, wherein a composition of an inner material, which forms the core, and a composition of an outer material, which forms the shell, are different.

The method of producing a semiconductor device for detection of electromagnetic radiation comprises using a solvent for applying a nanomaterial film above a main surface of a substrate of semiconductor material, at least part of the nanomaterial film having a scintillating property.

The nanomaterial film can be applied by inject printing, by silk-screen printing, by spin coating or by spray coating. Other suitable film deposition techniques may instead be applied.

BRIEF DESCRIPTION OF THE DRAWINGS

The following is a more detailed description in conjunction with the appended figures.

DETAILED DESCRIPTION

Figure 1:
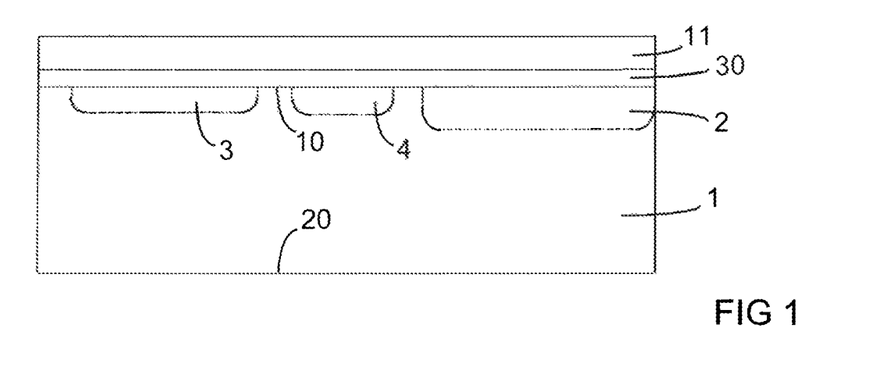
FIG. 1 is a cross section of a semiconductor device with a nanomaterial film applied on top.

FIG. 1 is a cross section of a semiconductor device with a nanomaterial film located on the top surface. The semiconductor device comprises a substrate 1 of semiconductor material, which may be silicon, silicon carbide, germanium or any combination thereof, for instance. The substrate 1 has a main surface 10 and an opposite main surface 20. An integrated circuit 2 is arranged in the substrate 1 and may especially be a CMOS circuit, for instance. In the example shown in FIG. 1, the integrated circuit 2 is arranged at the main surface 10. The integrated circuit 2 may be shielded, especially by a metal layer, to prevent light from leaking into the integrated circuit 2. Details of the integrated circuit 2 are not essential for the embodiment and are not shown in the figures.

A photodetector element 3 is arranged at the main surface 10. Instead of a single photodetector element 3, a plurality of photodetector elements 3 may be provided and may particularly be arranged to form an array for image detection, for instance. The photodetector element 3 may be a pn-diode, pin-diode, avalanche photodiode (APD), single-photon avalanche diode (SPAD) or silicon photo multiplier (SiPM), for example.

A guard ring 4 may be provided to separate the integrated circuit 2 from the photodetector element 3. If more than one photodetector element 3 is provided, a guard ring 4 may also be arranged between the photodetector elements 3. A dielectric layer 30, which may be an oxide, nitride or oxynitride of the semiconductor material, or several alternating layers of oxide and silicon, or a high-k dielectric, such as hafnium oxide, tantalum pentoxide or gadolinium oxide, for instance, is optionally arranged on or above the main surface 10.

A nanomaterial film 11 is arranged on the top surface, in particular on or above the dielectric layer 30. The nanomaterial film 11 may essentially cover the entire top surface of the device. At least part of the nanomaterial film 11 has a scintillating property as explained above. The nanomaterial film 11 may include nanodots, nanorods or nanowires or a combination thereof. It may be made from PbS, PbSe, ZnS, ZnS, CdSe, CdTe, for example, but it may comprise other materials as well. A nanodot film can be applied by inkjet printing, silk-screen printing, spin coating or spray coating, for instance. These methods are known per se and are not described here.

The nanomaterial film 11 may especially comprise a core-shell structure, wherein a composition of an inner material of the nanomaterial film 11, which forms the core, and a composition of an outer material of the nanomaterial film 11, which forms the shell, are different. Part of the nanomaterial film 11 may have an absorbing property.

In the device shown in FIG. 1, the nanomaterial film 11 covers the entire area of the main surface 10. Instead, the nanomaterial film 11 may only cover a part of the main surface 10.

Figure 2:
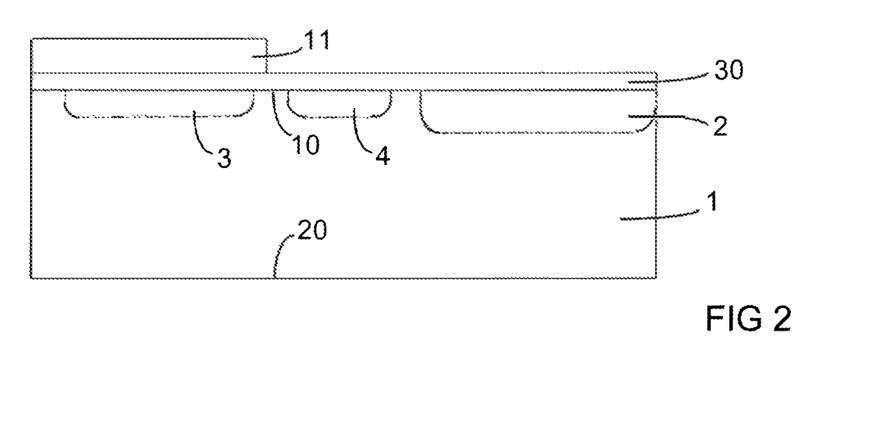
FIG. 2 is a cross section of a semiconductor device partially covered with a nanomaterial film.

FIG. 2 is a cross section according to FIG. 1 of a further semiconductor device. Elements of the semiconductor device according to FIG. 2 that correspond to elements of the semiconductor device according to FIG. 1 are designated with the same reference numerals. In the semiconductor device according to FIG. 2, the nanomaterial film 11 does not cover the entire area of the main surface 10. In particular, the nanomaterial film 11 may be confined to cover the area of the photodetector element 3 or array of photodetector elements 3.

Figure 3:
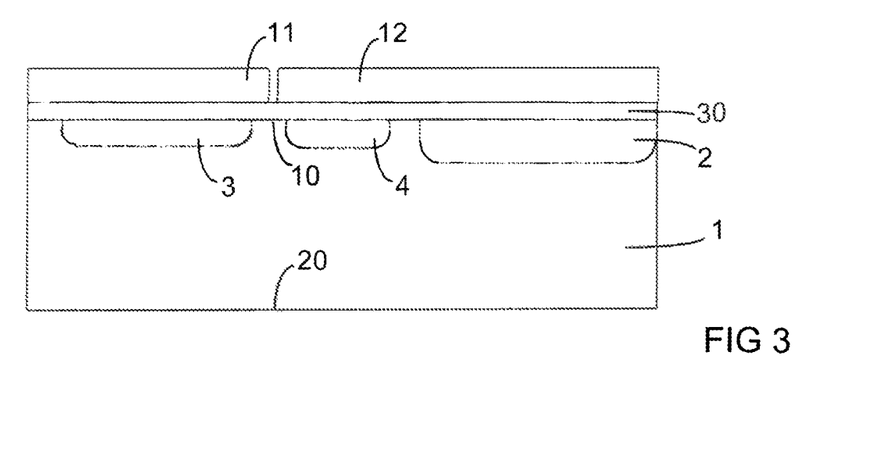
FIG. 3 is a cross section of a semiconductor device with films of different types of nanomaterials.

FIG. 3 is a cross section according to FIG. 1 of a further semiconductor device. Elements of the semiconductor device according to FIG. 3 that correspond to elements of the semiconductor device according to FIG. 1 are designated with the same reference numerals. The semiconductor device according to FIG. 3 comprises a first nanomaterial film 11 and a second nanomaterial film 12, and these nanomaterial films 11, 12 cover different areas of the main surface 10. The nanomaterial films 11, 12 may especially comprise two different types of nanodots, nanorods or nanowires or combinations thereof. In particular, the first nanomaterial film 11 may be a scintillating film and the second nanomaterial film 12 may absorb the incident radiation.

In the example shown in FIG. 3, the area of the photodetector element 3 or array of photodetector elements 3 is covered with the first nanomaterial film 11, which is a light-emitting film. The area of the integrated circuit 2 and the guard ring 4 is covered with the second nanomaterial film 12, which does not emit light.

Figure 4:
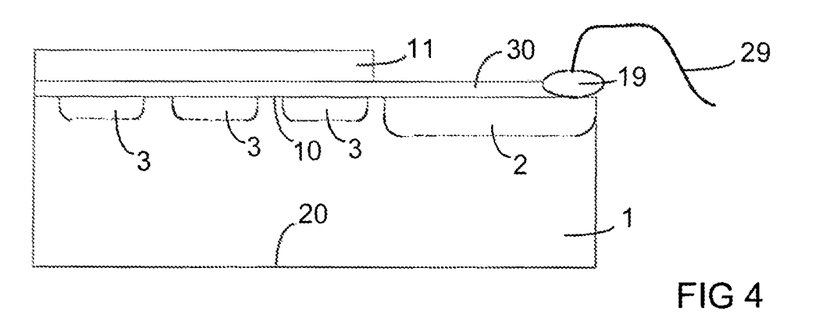
FIG. 4 is a cross section according to FIG. 2 of a device with an array of photodetector elements.

FIG. 4 is a cross section according to FIG. 2 of a further semiconductor device. Elements of the semiconductor device according to FIG. 4 that correspond to elements of the semiconductor device according to FIG. 2 are designated with the same reference numerals. The semiconductor device according to FIG. 4 comprises a plurality of photodetector elements 3, which may especially be arranged in an array for image detection, for instance. One single scintillating nanomaterial film 11 covers the area of the array of photodetector elements 3. A solder ball 19 may be provided on a terminal of the integrated circuit 2, and a bonding wire 29 may be applied to the solder ball 29 for external electric connection.

Figure 5:
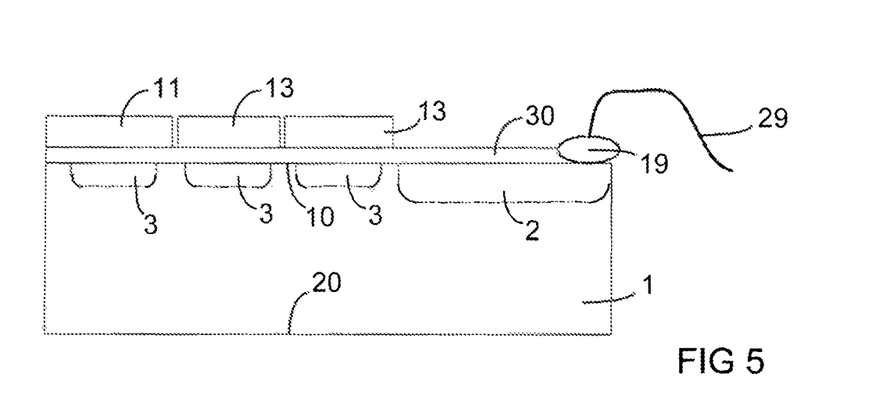
FIG. 5 is a cross section according to FIG. 4 of a device with separate portions of the nanomaterial film.

FIG. 5 is a cross section according to FIG. 4 of a further semiconductor device. Elements of the semiconductor device according to FIG. 5 that correspond to elements of the semiconductor device according to FIG. 4 are designated with the same reference numerals. The semiconductor device according to FIG. 5 comprises a plurality of photodetector elements 3, which may especially be arranged in an array for image detection, for instance. Each photodetector element 3 is covered by a nanomaterial film 11, 13. FIG. 5 shows a first nanomaterial film 11 and further nanomaterial films 13, by way of example. Each photodetector element 3 can be provided with a separate scintillating nanomaterial film 11, 13, thus enabling spectral CT, for instance.

Figure 6:
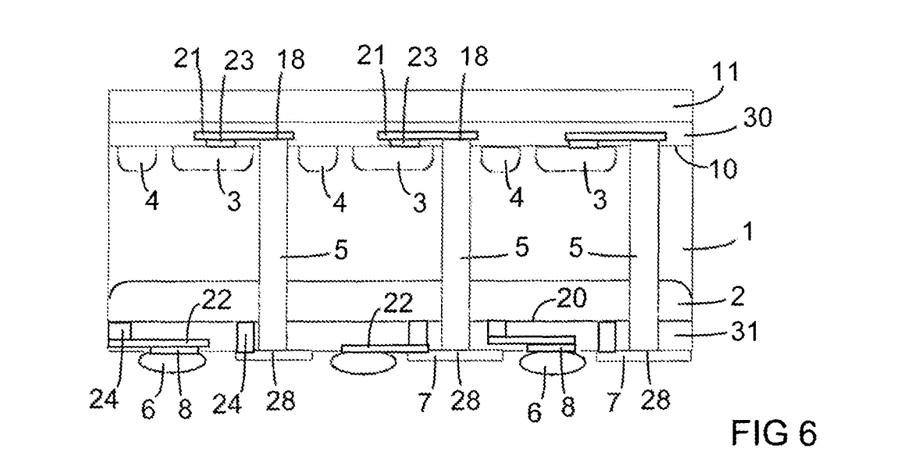
FIG. 6 is a cross section of a further semiconductor device with a nanomaterial film applied on top.

FIG. 6 is a cross section according to FIG. 1 of a further semiconductor device. Elements of the semiconductor device according to FIG. 6 that correspond to elements of the semiconductor device according to FIG. 1 are designated with the same reference numerals. The semiconductor device according to FIG. 6 comprises a further dielectric layer 31 on the opposite main surface 20. An integrated circuit 2 is arranged at the opposite main surface 20. A wiring comprising metal layers 21 and vias 23 is arranged in the dielectric layer 30. A further wiring comprising further metal layers 22 and further vias 24 is arranged in the further dielectric layer 31. Contact pads 8 may be arranged on the further metal layers 22 to provide contact areas for the application of external electric contacts like solder balls 6. An electrically conductive redistribution layer 7 may be arranged on the further dielectric layer 31. One single scintillating nanomaterial film 11 covers the entire main surface 10.

Through-substrate vias 5 comprising an electrically conductive material may be arranged in the substrate 1 to connect a contact area 18 of a metal layer 21 with a further contact area 28 of the redistribution layer 7 or with a contact area of one of the further metal layers 22. The through-substrate vias 5 are suitable to establish electric connections between the photodetector elements 3 and the integrated circuit 2.

Figure 7:
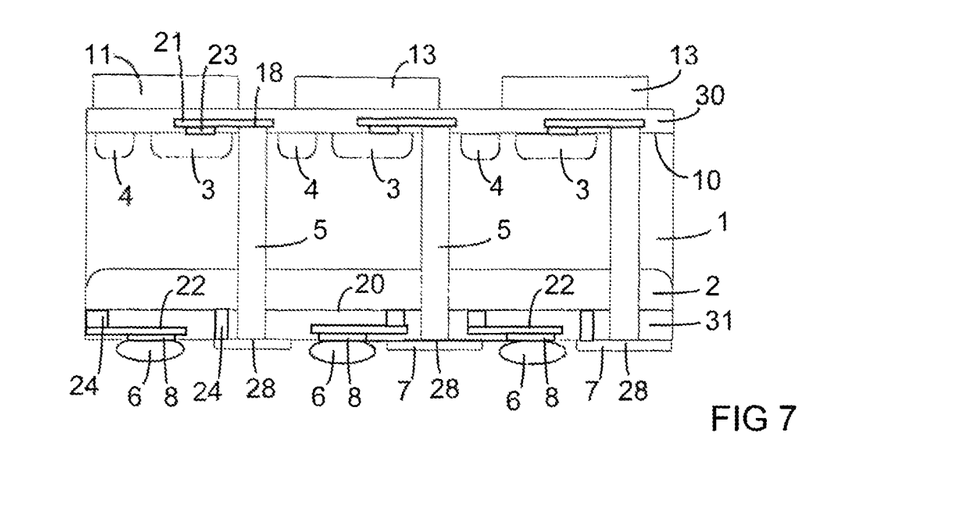
FIG. 7 is a cross section according to FIG. 6 of a device with separate portions of the nanomaterial film.

FIG. 7 is a cross section according to FIG. 6 of a further semiconductor device. Elements of the semiconductor device according to FIG. 7 that correspond to elements of the semiconductor device according to FIG. 6 are designated with the same reference numerals. The semiconductor device according to FIG. 7 comprises a plurality of photodetector elements 3, which may especially be arranged in an array for image detection, for instance. Each photodetector element 3 is covered by a nanomaterial film 11, 13. FIG. 7 shows a first nanomaterial film 11 and further nanomaterial films 13, by way of example. Each photodetector element 3 can be provided with a separate scintillating nanomaterial film 11, 13, thus enabling spectral CT, for instance.

Figure 8:
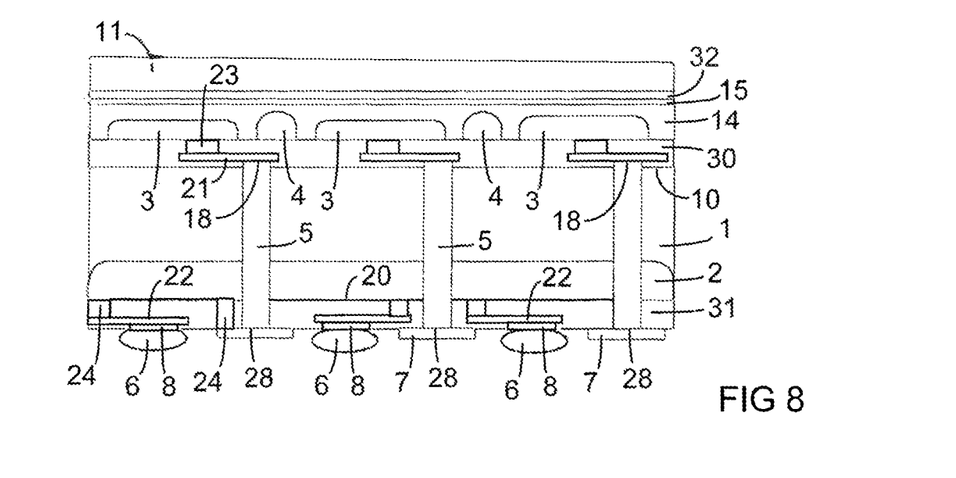
FIG. 8 is a cross section of a semiconductor device with a separate semiconductor layer and a nanomaterial film applied on top.

FIG. 8 is a cross section according to FIG. 6 of a further semiconductor device. Elements of the semiconductor device according to FIG. 8 that correspond to elements of the semiconductor device according to FIG. 6 are designated with the same reference numerals. The semiconductor device according to FIG. 8 comprises a semiconductor layer 14, which may be a thinned further semiconductor substrate, for instance, and second further dielectric layer 32 on the semiconductor layer 14. An implant layer 15, which may be formed by an implantation of a dopant, can be provided at the boundary between the semiconductor layer 14 and the second further dielectric layer 32. One single scintillating nanomaterial film 11 covers the entire main surface 10.

The photodetector elements 3 and the optional guard rings 4 are arranged in the semiconductor layer 14. The wirings 21, 22, 23, 24 and the through-substrate vias 5 can be adapted to connect the photodetector elements 3 with the integrated circuit 2.

Figure 9:
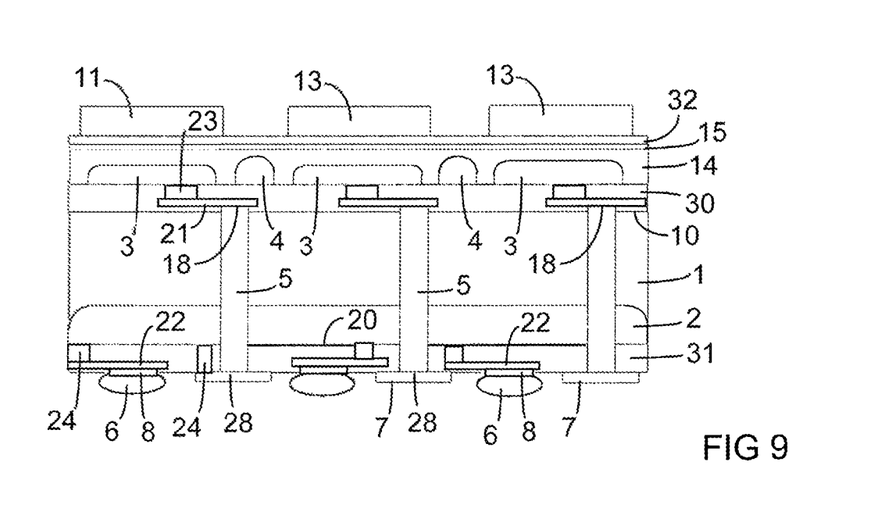
FIG. 9 is a cross section according to FIG. 8 of a device with separate portions of the nanomaterial film.

FIG. 9 is a cross section according to FIG. 8 of a further semiconductor device. Elements of the semiconductor device according to FIG. 9 that correspond to elements of the semiconductor device according to FIG. 8 are designated with the same reference numerals. The semiconductor device according to FIG. 9 comprises a plurality of photodetector elements 3, which may especially be arranged in an array for image detection, for instance. Each photodetector element 3 is covered by a nanomaterial film 11, 13. FIG. 9 shows a first nanomaterial film 11 and further nanomaterial films 13, by way of example. Each photodetector element 3 can be provided with a separate scintillating nanomaterial film 11, 13, thus enabling spectral CT, for instance.

Figure 10:
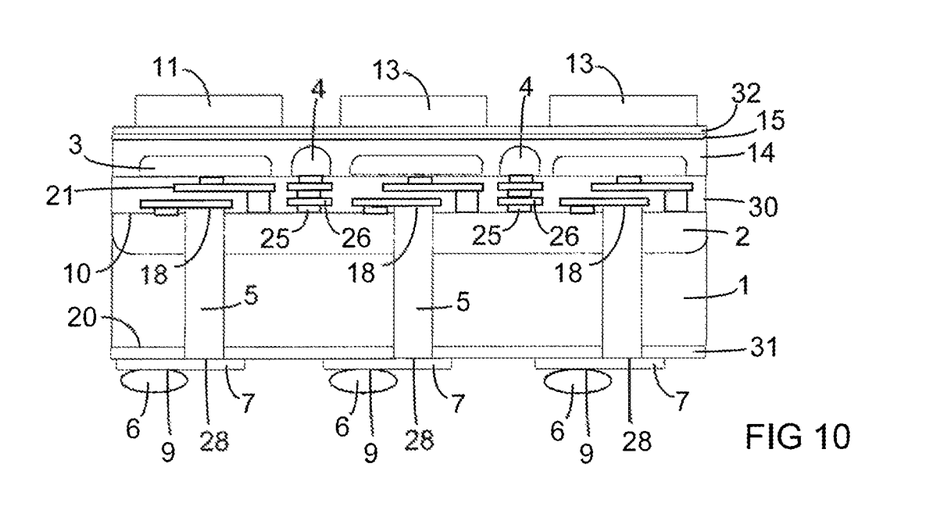
FIG. 10 is a cross section according to FIG. 9 of a further semiconductor device with a nanomaterial film applied on top.

FIG. 10 is a cross section according to FIG. 9 of a further semiconductor device. Elements of the semiconductor device according to FIG. 10 that correspond to elements of the semiconductor device according to FIG. 9 are designated with the same reference numerals. In the semiconductor device according to FIG. 10, the integrated circuit 2 is arranged at the main surface 10. The electric connections between the photodetector elements 3 and the integrated circuit 2 are established by metal interconnections of the wiring. Such a conductive structure may be produced by applying conductors on two separate substrates, which are then connected by wafer bonding, for example. The electric connections at the opposite main surface 20 are provided by a structured electrically conductive layer, which can especially be a redistribution layer 7. Solder balls 6 can directly be applied on contact areas 9 of the redistribution layer 7.

The semiconductor device according to FIG. 10 comprises a plurality of photodetector elements 3, which may especially be arranged in an array for image detection, for instance, and each photodetector element 3 is covered by a nanomaterial film 11, 13. FIG. 10 shows a first nanomaterial film 11 and further nanomaterial films 13, by way of example. Each photodetector element 3 can be provided with a separate scintillating nanomaterial film 11, 13, thus enabling spectral CT, for instance. In an alternative embodiment according to FIG. 10, one single scintillating nanomaterial film 11 covers the entire main surface 10.

Further vias 25 may be arranged between sections of the metal layers 21 to form a metal interconnect 26 under the guard rings 4. The metal interconnect 26 improves the separation of the pixels, each of which includes the region of one of the photodetector elements 3.

Figure 11:
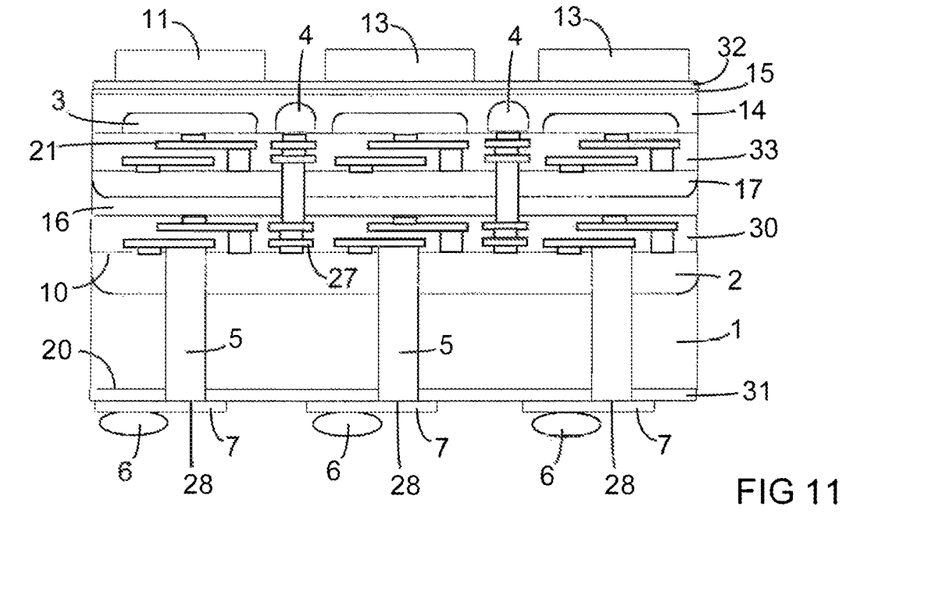
FIG. 11 is a cross section of a semiconductor device with two separate semiconductor layers and a nanomaterial film applied on top.

FIG. 11 is a cross section according to FIG. 9 of a further semiconductor device. Elements of the semiconductor device according to FIG. 11 that correspond to elements of the semiconductor device according to FIG. 9 are designated with the same reference numerals. In the semiconductor device according to FIG. 11, the integrated circuit 2 is arranged at the main surface 10. A further semiconductor layer 16, which may be a thinned further semiconductor substrate, for instance, and a third further dielectric layer 33 are arranged between the substrate 1 and the semiconductor layer 14. A further integrated circuit 17 can be arranged in the further semiconductor layer 16. The integrated circuit 2 may especially be provided as a digital CMOS circuit, while the further integrated circuit 17 may especially be provided as an analog CMOS circuit, for example.

The semiconductor device according to FIG. 11 comprises a plurality of photodetector elements 3, which may especially be arranged in an array for image detection, for instance. Each photodetector element 3 is covered by a nanomaterial film 11, 13. FIG. 11 shows a first nanomaterial film 11 and further nanomaterial films 13, by way of example. Each photodetector element 3 can be provided with a separate scintillating nanomaterial film 11, 13, thus enabling spectral CT, for instance. In an alternative embodiment according to FIG. 11, one single scintillating nanomaterial film 11 covers the entire device.

Further metal interconnects 27 may be arranged penetrating the dielectric layer 30, the further semiconductor layer 16 and the third further dielectric layer 33, as shown in FIG. 11. Apart from the purpose of separating the pixels, the further metal interconnects 27 may be provided as electric connections between the photodetector elements 3 and the integrated circuit 2.

In the semiconductor device comprising a plurality of photodetector elements and scintillating films, a first incoming radiation energy is transformed to light of a first wavelength by a first nanomaterial film. The corresponding photodetector element converts this light into a first photocurrent. A second incoming radiation energy is transformed to light of a second wavelength by a second nanomaterial film. The corresponding photodetector element converts this light into a second photocurrent. This procedure can similarly be applied to three or more energy levels, using three or more nanomaterial films and photodetector elements.

Figure 12:
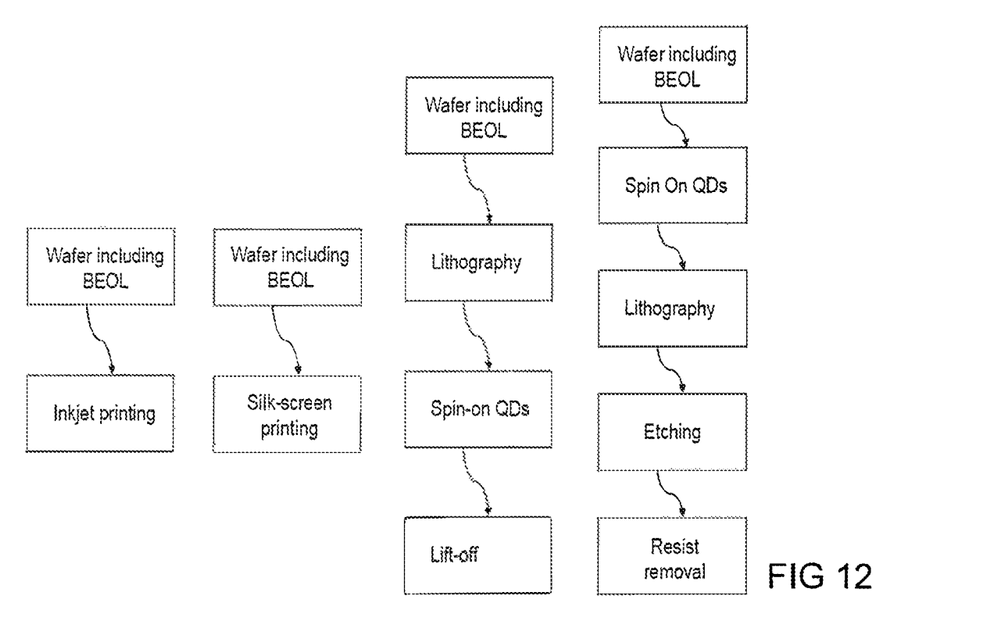
FIG. 12 is a flow chart of methods of patterned deposition of nanodot films.

FIG. 12 is a flow chart of methods of producing patterned nanodot films. These methods include inkjet printing, silkscreen printing, lithography with subsequent spin coating and lift-off by removing the resist mask, and spin coating with subsequent lithography, etching and removal of the resist mask.

In the manufacturing process, the nanomaterial film 11 is applied on top of a semiconductor chip or wafer after the standard process, in particular after the back end of line (BEOL).

Figure 13:
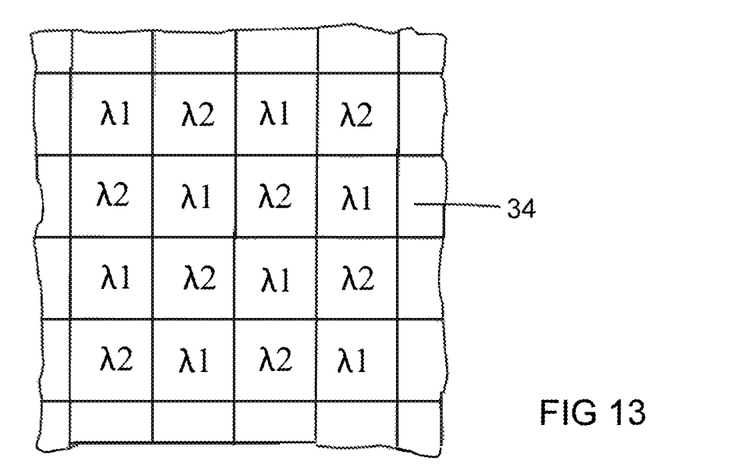
FIG. 13 is a schematic top view of a section of a pixel array.

FIG. 13 is a schematic top view of a section of a pixel array 34. The area of a conventional pixel, which has typically a size of approximately 1 mm·1 mm, is divided in at least four parts. In the example shown in FIG. 13, the area of a conventional pixel is divided into four quadrants, each of which has a size of approximately 250 µm·250 µm. On top of each quadrant, a scintillating nanomaterial film is deposited. Each nanomaterial film is configured to have its absorption spectrum maximized in a certain x-ray energy range and emits light of a distinct wavelength or spectrum. In the example shown in FIG. 13, the quadrants are adapted to two wavelengths $\lambda 1$ and $\lambda 2$, according to a checkered pattern. Other arrangements may be suitable as well.

The photodetector elements 3 located under the quadrants sense the different wavelengths $\lambda 1$, $\lambda 2$. Hence it is possible to compute the x-ray spectrum from the different electrical signals, which can be evaluated by the integrated circuit 2 in the substrate 1. Finally, a digital value for each light intensity can be generated. The pixels may be covered by a pattern optimized for one wavelength (energy). The final image can be reconstructed by interpolating the missing wavelengths from the neighboring pixels, similarly to RGB color imaging for visible light.

Figure 14:
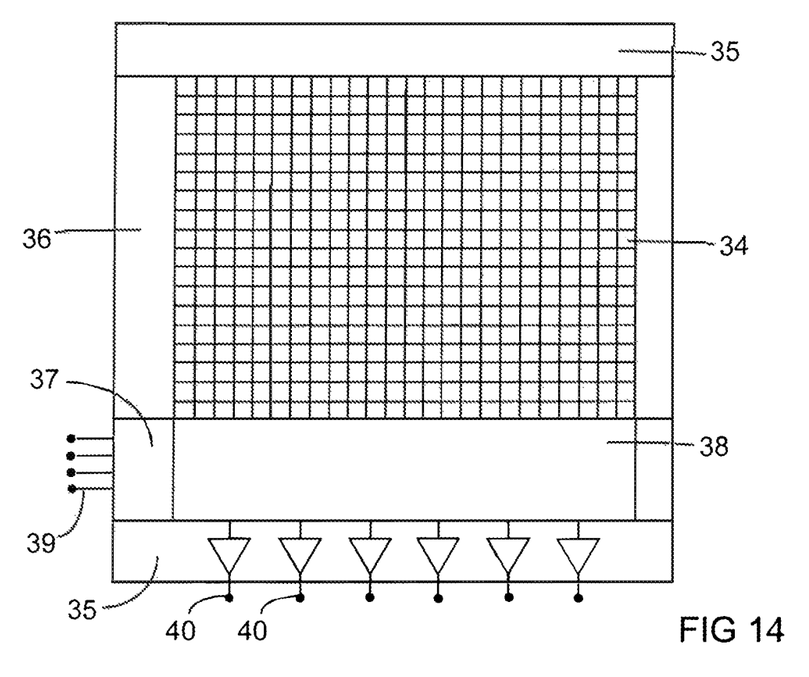
FIG. 14 is a schematic top view of an image detection device including the pixel array.

FIG. 14 is a schematic top view of an image detection device including the pixel array 34. The remaining surface area, outside the pixel array 34, can be covered with an absorbing nanomaterial film. This surface area covers different regions of the device, which may be disposed in the following manner, by way of example. A first region 35 may be provided for power distribution and the arrangement of I/O pads, a second region 36 for row addressing, and a third region 37 for control and/or logic circuits. A column amplifier may be arranged in a fourth region 38, which can also accommodate components for analog-to-digital conversion and multiplexing. FIG. 14 also shows input nodes 39 for clock and control signals and output nodes 40.

The properties of a nanodot, nanorod or nanowire film can be adapted to obtain absorption in a desired range of radiation energies and emission in a desired range of wavelengths. As nano materials have tunable emission lifetimes, they enable to realize ultra-fast scintillators. A nanodot, nanorod or nanowire film can be made thinner than a conventional scintillator and also laterally more compact. These advantages result in substantially smaller pixel sizes, higher resolution, lower crosstalk between pixels and better modulation transfer function of a high-energy electromagnetic radiation imaging system, in particular x-ray or CT imaging systems with spectral x-ray analysis capabilities.

The invention claimed is:

1. A semiconductor device for detection of x-rays or gamma-rays, comprising:
   a substrate of semiconductor material having a main surface,
   an integrated circuit in the substrate,
   a nanomaterial film arranged above the main surface, at least part of the nanomaterial film having a scintillating property,
   a photodetector element or array of photodetector elements arranged in the substrate at the main surface, the photodetector element or array of photodetector elements being configured to detect electromagnetic radiation transformed by the nanomaterial film, and
   a dielectric layer arranged between the nanomaterial film and the photodetector element or array of photodetector elements, such that the dielectric layer is arranged on the main surface of the substrate, and the nanomaterial film is arranged on the dielectric layer, wherein a wiring is arranged in the dielectric layer.

2. The semiconductor device according to claim 1, wherein
   the nanomaterial film comprises nanodots, nanorods or nanowires or any combination thereof.

3. The semiconductor device according to claim 1, further comprising:
   a further nanomaterial film, at least part of the further nanomaterial film having an absorbing property and covering an area of the main surface outside the photodetector element or array of photodetector elements.

4. The semiconductor device according to claim 3, wherein
   the further nanomaterial film comprises nanodots, nanorods or nanowires or any combination thereof.

5. The semiconductor device according to claim 1, further comprising:
   the photodetector element or array of photodetector elements comprising at least two photodetector elements,
   at least one further nanomaterial film, at least part of which has a scintillating property, and
   each one of the at least two photodetector elements being covered by the nanomaterial film or the at least one further nanomaterial film.

6. The semiconductor device according to claim 5, wherein the nanomaterial film and the at least one further nanomaterial film are matched to two different electromagnetic energy levels, wherein the two different electromagnetic energy levels are either x-rays or gamma-rays.

7. The semiconductor device according to claim 5, wherein
the nanomaterial film and the at least one further nanomaterial film have different emission wavelengths.

8. The semiconductor device according to claim 1, wherein
the nanomaterial film has an emission wavelength in the range from 300 nm to 1000 nm.

9. The semiconductor device according to claim 1, wherein
the nanomaterial film has an emission wavelength in the range from 400 nm to 850 nm.

10. The semiconductor device according to claim 1, wherein
the nanomaterial film comprises PbS, PbSe, ZnS, ZnS, CdSe, CdTe or a combination thereof.

11. The semiconductor device according to claim 1, wherein
the nanomaterial film comprises a core-shell structure, wherein a composition of an inner material and a composition of an outer material are different.

12. A method of producing a semiconductor device for detection of x-rays or gamma-rays, comprising:
using a solvent for applying a nanomaterial film above a main surface of a substrate of semiconductor material, at least part of the nanomaterial film having a scintillating property,
wherein an integrated circuit is arranged in the substrate, wherein a photodetector element or an array of photodetector elements is arranged in the substrate at the main surface, and wherein a dielectric layer is applied on the main surface of the substrate, the nanomaterial film being applied on the dielectric layer, and wherein a wiring is arranged in the dielectric layer.

13. The method of claim 12, further comprising:
applying the nanomaterial film by inject printing.

14. The method of claim 12, further comprising:
applying the nanomaterial film by silk-screen printing.

15. The method of claim 12, further comprising:
applying the nanomaterial film by spin coating.

16. The method of claim 12, further comprising:
applying the nanomaterial film by spray coating.

17. A semiconductor device for detection of x-rays or gamma-rays, comprising:
a substrate of semiconductor material having a main surface,
integrated circuit in the substrate,
a nanomaterial film arranged above the main surface, at least part of the nanomaterial film having a scintillating property, and
a photodetector element or array of photodetector elements arranged in a semiconductor layer between the main surface and the nanomaterial film, the photodetector element or array of photodetector elements being configured to detect electromagnetic radiation transformed by the nanomaterial film,
a dielectric layer arranged between the substrate and the semiconductor layer, wherein a wiring is arranged in the dielectric layer, and
a further dielectric layer arranged on the semiconductor layer, the nanomaterial film being arranged on the further dielectric layer.

* * * * *